Oct. 7, 1941.  H. B. HULL  2,257,801
REFRIGERATING APPARATUS
Filed Nov. 29, 1938
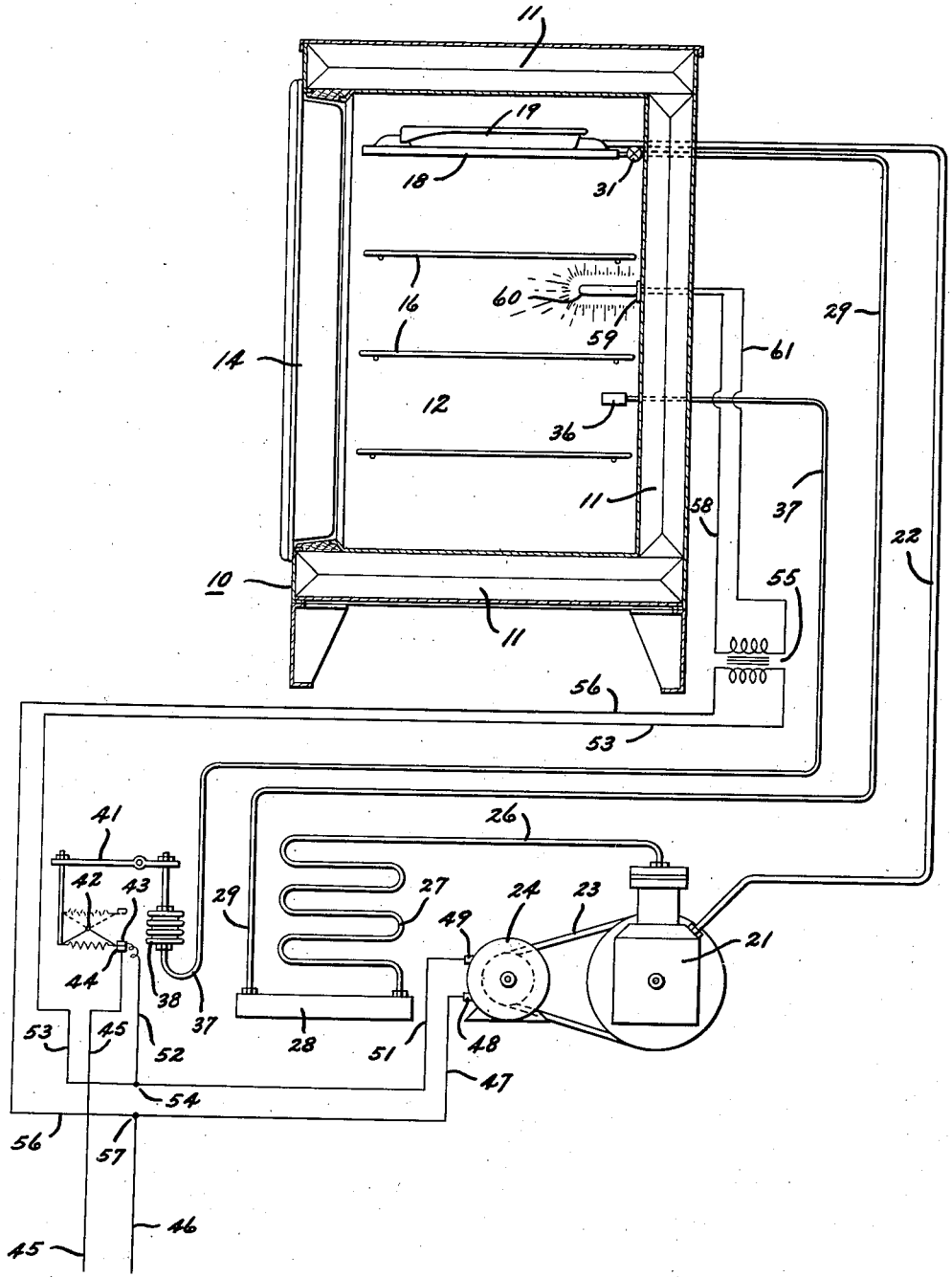
INVENTOR.
HARRY B. HULL.
BY Spencer, Hardman and Fale.
HIS ATTORNEYS.

Patented Oct. 7, 1941

2,257,801

UNITED STATES PATENT OFFICE 2,257,801

REFRIGERATING APPARATUS

Harry B. Hull, Dayton, Ohio, assignor to General Motors Corporation, Dayton, Ohio, a corporation of Ohio Application November 29, 1938, Serial No. 242,946

1 Claim. (Cl. 62—89)

This invention relates to refrigeration and particularly to refrigerating and treating foods stored in a refrigerated storage compartment.

It has heretofore been recognized that foods stored in a refrigerated compartment can be treated with ultra-violet radiation to cause the action of bacteria and the like to be arrested and to kill or render microorganisms dormant whereby the foods will be purified and properly preserved. In the storage of foods or food products I have found that the maintenance of the foods between certain low temperature limits or at a substantially uniform temperature and the treatment thereof by ultra-violet radiation during such storage are equally important factors to the proper preservation and purification of the foods. As far as I am aware, these two factors have not been given careful consideration by others upon dealing with the subject of treating foods with or by ultra-violet radiation during refrigeration or cold storage of such products. Therefore, in most cases of treatment of foods by ultra-violet radiation and sterilization of air about the foods in refrigerated storage compartments, the duration of effectiveness of the ultra-violet lamp or lamps upon the foods or air surrounding same has been manually controlled, and such control has not been entirely satisfactory. In some instances the ultra-violet lamp or lamps are permitted to remain effective over a long period of time, thus resulting in current consumption far in excess of that required to properly treat the foods. In certain types of constructions this excessive period of time of ultra-violet radiation also results in raising the temperature in the food storage compartment beyond a desired or preferred limit at which such treatment is effective. Often the treatment of foods over long periods of time has caused overtreatment thereof which has resulted in producing a deleterious effect upon consumers of the over-treated food. I have discovered that the treatment of foods during cold storage thereof by ultra-violet radiation in the ordinary use of a refrigerator cabinet, taking into consideration the number of times the access door to the food compartment is opened and the duration of time such door is left open, need not be extended over 10 or 12 hours of a 24-hour period of time. In the ordinary use of a mechanically refrigerated household refrigerator the treatment of foods or of the air in the vicinity thereof for more than 10 to 12 hours throughout a single day is excessive and far greater than is required. In view of my discovery I contemplate the provision of an improved refrigerating apparatus for food storage wherein proper temperature preservation of the food is obtained and effective, yet not excessive treatment of the food or sterilization of air in the food storage compartment by ultra-violet radiation is insured.

Therefore, an object of my invention is to provide an improved food storage apparatus in which the food products are treated and the air surrounding same is sterilized by beneficial light rays such as ultra-violet radiation while at the same time maintaining the foods at a substantially uniform low temperature.

Another object of my invention is to provide an improved refrigerating apparatus wherein beneficial light rays such as ultra-violet radiation are or is intermittently rendered effective automatically in response to conditions of the refrigerating apparatus to treat foods refrigerated in the cold storage compartment of the apparatus and to sterilize the air in the compartment to purify the foods and the air in which they are stored for insuring proper preservation thereof.

In carrying out the foregoing objects it is a further and more specific object of my invention to provide a refrigerating apparatus wherein an ultra-violet lamp, employed to treat foods stored in the refrigerated storage compartment of the apparatus and to sterilize the air therein, is rendered effective by operation of the refrigerant liquefying and circulating unit of the apparatus and rendered ineffective by stopping the operation thereof to provide for the removal of heat during its generation by the lamp for insuring the maintenance of a substantially uniform temperature within the food storage compartment.

Further objects and advantages of the present invention will be apparent from the following description, reference being had to the accompanying drawing wherein a refrigerating system constructed and arranged in accordance with the invention is diagrammatically disclosed and is associated with the refrigerator cabinet shown in section.

Referring to the drawing, I have shown a refrigerating cabinet, generally represented by the reference character 10, and comprising a plurality of insulated walls 11 enclosing a food storage compartment or chamber 12. The compartment 12 has an access opening in one wall thereof which is provided with a door 14 for closing the opening. The compartment 12 has a plurality of food supporting shelves 16 located therein for dividing the interior thereof into a plurality of food storage spaces. In order to cool the food storage compartment 12 and cause circulation of air therein I mount, in any suitable or convenient manner, a cooling element or evaporator 18 in the upper part of the compartment. Cooling element or evaporator 18 may be of any suitable or conventional construction but is preferably of the sheet metal type formed of double sheet metal walls having refrigerant conveying and evaporating passages therebetween. The evaporator 18 may be provided with a sharp freezing refrigerated support for receiving and supporting a tray 19 adapted to contain substance to be frozen.

A refrigerant liquefying and circulating unit or mechanism is connected to the evaporator 18 and is associated with the refrigerator cabinet 10. This unit or mechanism is ordinarily mounted within a compartment of cabinet 10 separate from the compartment 12. The unit or mechanism includes a compressor 21 having a conduit connection 22 with the evaporator 18. Compressor 21 is operated through a belt and pulley, or any other suitable driving, connection 23 by an electric motor 24. Compressor 21 also has a pipe connection 26 with a condenser 27 which condenser is connected to a receiver 28. A pipe 29 connected to receiver 28 extends to the evaporator 18 and has an expansion valve or other suitable refrigerant inlet control valve 31 interposed therein. The elements of the refrigerating system thus far described are all connected together to form a closed refrigerant flow circuit. Operation of the compressor 21 by motor 24 causes same to withdraw refrigerant evaporated in the evaporator 18 therefrom and which gaseous refrigerant flows into the compressor by way of the conduit 22. The compressor 21 compresses the gaseous refrigerant withdrawn from evaporator 18, in the process of causing the evaporator to produce a refrigerating effect, and discharges the compressed refrigerant through pipe 26 into the condenser 27. The compressed refrigerant entering the condenser 27 is cooled, in any suitable and well-known manner, and liquefied therein, whereupon it flows into the receiver 28 for storage prior to being directed to the evaporator 18. The valve 31 in pipe 29 controls or regulates the flow of liquid refrigerant from pipe 29 into the evaporator 18 in accordance with the demand for refrigerant to be evaporated within the evaporator. In order to maintain evaporator 18 between certain low temperature limits and consequently compartment 12 at a substantially uniform temperature I locate a thermostat bulb 36 within the food compartment 12 and connect this bulb 36, by a pipe 37, to an expansible and contractable member such, for example, as a bellows 38. The bulb 36, pipe 37 and bellows 38 form a closed thermostatic system for operating a switch 41, preferably comprising a conventional or a well-known snap-acting mechanism 42, which controls the flow of electric current to motor 24. The snap-acting mechanism 42 of switch 41 includes a pair of contacts 43 and 44 which are shown in the present disclosure as being in engagement with one another. The stationary switch contact 44 is connected to the electric power line 45 and the other power line 46 is connected by wire 47 to a terminal 48 on the electric motor 24. The other terminal 49 on motor 24 is connected, by wires 51 and 52 to the movable switch contact 43. A wire 53 connected at 54 to wires 51 and 52 extends to a transformer, generally represented by the reference character 55, and another wire 56 extends from the transformer 55 and is connected as at 57 to the power line 46. The electric circuit described may be of 110 volt and the transformer 55 is of the step up type wherein the 110 volt current is increased to approximately 600 volt. The 600 volt circuit leading from transformer 55 includes a wire 58 connected to a receptacle or adapter 59 mounted on an upright wall of the food compartment 12 of refrigerator cabinet 10 and a wire 61 also connected to the adapter or receptacle 59 and to the transformer 55. In reality, the circuit including the wires 58 and 61 and the adapter or receptacle 59 is a part of the electric circuit for the refrigerant liquefying and circulating unit. Therefore, the receptacle or adapter 59 may be said to be interposed in the electric circuit of the refrigerating machine. Also, a lamp, to be hereinafter more fully described, and adapted to be placed in receptacle 59 may be said to be interposed in the electric circuit leading to the switch 41 and motor 24 of the refrigerating machine.

The thermostat bulb 36 of the thermostatic system, comprising bulb 36, pipe 37 and bellows 38, is responsive to the temperature produced by the evaporator 18 within the food compartment 12 of cabinet 10, and a volatile refrigerant medium sealed within the thermostatic system will cause expansion and/or constriction of bellows 38 in accordance with an increase or decrease in temperature within the compartment 12. The bellows 38 thus actuates the snap mechanism 42 of switch 41 to bring the contacts 43 and 44 together or to separate same for starting and/or stopping the operation of motor 24 and consequently compressor 21 in the arrangement of producing refrigeration as disclosed.

In order to accomplish the objects of the present invention I place an ultra-violet ray-emitting lamp 60 in the adapter or receptacle 59. Since the receptacle 59 is connected in the electric circuit to motor 24 of the refrigerating system it is obvious that lamp 60 will be rendered effective when the contacts 43 and 44 of control switch 41 are in engagement with one another to complete the circuit to the electric motor 24 to cause operation of the refrigerant liquefying and circulating unit or mechanism of the refrigerating system. When the contacts 43 and 44 are in engagement with one another as shown in the drawing electric current flows through power line 45, contacts 44 and 43, wires 52 and 51 to the one terminal 49 on motor 24 and thence through wire 47 to the power line 46. Electric current also flows through the wires 53 and 56 to transformer 55 to render same effective to energize wires 58 and 61 and consequently lamp 60. Obviously, this circuit to motor 24 is broken by separation of contact 43 from contact 44 of switch 41 to stop operation of motor 24. The separation of switch contacts 43 and 44 also breaks the circuit to the transformer 55 to render same ineffective to deenergize lamp 60. Thus lamp 60 is effective only when the refrigerant liquefying and circulating unit is operated. The lamp 60 is located within the food storage compartment 12 of cabinet 10 and may be of any ordinary or conventional construction, for example, ultra-violet lamp 60 may be of the sealed bulb type now sold on the open market and which is of from 10 to 20 watt-hour capacity on approximately a 600 volt circuit. During the effectiveness of the ultra-violet lamp 60 to treat food products stored within the refrigerated compartment 12 of the refrigerator 10 and to sterilize the air within the compartment for arresting the action of bacteria and the like or for other beneficial purposes, the refrigerant liquefying and circulating unit or mechanism is operating to thereby withdraw, through the evaporator 18, heat generated by the lamp. Thus the ultra-violet lamp 60 is prevented from increasing the temperature within the storage compartment 12 and the food therein is definitely maintained between predetermined temperature limits or at a substantially uniform temperature. In preventing the lamp 60 from increasing the temperature within compartment 12 of cabinet 10 in the manner disclosed during effectiveness of the lamp to treat foods in the compartment, I obtain ideal conditions under which the food should be treated. In other words, by maintaining the foods and the air within compartment 12 of the refrigerator 10 between predetermined temperature limits or at a substantially uniform low temperature, the treatment of the foods and the sterilization of the air surrounding same is carried out in an improved effective manner. Since the refrigerating machine is cyclically operated and is in operation approximately half of the time that refrigeration is produced within compartment 12, the ultra-violet lamp 60 is rendered effective automatically and intermittently at intervals throughout the duration of refrigeration of the foods. It has been found that treatment of food and sterilization of air in a refrigerator cabinet is most important when the temperature rises in the food compartment such as by heat leakage through the refrigerator cabinet walls and about the refrigerator cabinet door or as by opening the door and inserting relatively warm foods into the compartment. In such cases my improved apparatus and the arrangement of elements thereof causes same to immediately respond to such conditions to not only reduce the temperature within the food storage compartment but to also render the ultra-violet lamp effective for retreating the foods and resterilizing the air within the refrigerated compartment.

It will be apparent from the foregoing that I have provided an improved refrigerating apparatus and a novel and effective method of treating foods stored in the food compartment of the apparatus to purify the foods and to properly preserve same. In my improved apparatus the food treating lamp is effective only when the refrigerating unit or machine operates, and in so operating to reduce the temperature of the food storage compartment it also simultaneously removes heat generated by the lamp. Since the maintenance of the foods in a refrigerated compartment between predetermined low temperature limits or at a substantially uniform low temperature is an equally important factor to that of treating the foods or sterilizing the surrounding air with ultra-violet radiation to kill or arrest the action of bacteria, my invention is particularly meritorious because it insures the carrying out or completion of both factors in food storage in order to obtain proper purification and preservation of the foods. By constructing my improved apparatus so that the ultra-violet ray producing lamp is rendered effective intermittently and automatically only when the refrigerating unit or machine is in operation, I prevent over-treatment of the foods to thereby eliminate the danger of producing a deleterious effect upon a person who may consume the treated foods.

While the form of embodiment of the invention as herein disclosed, constitutes a preferred form, it is to be understood that other forms might be adopted, all coming within the scope of the claim which follows.

What is claimed is as follows:

A refrigerating apparatus comprising in combination, a cabinet having a closed refrigerating system associated therewith, said cabinet being provided with a food storage compartment, said refrigerating system comprising a cooling element mounted within said cabinet and adapted to chill air in said food compartment, said refrigerating system also including a refrigerant circulating unit connected to said cooling element, an electric circuit for said unit, an ultra-violet lamp mounted within said cabinet and adapted to emit its rays into said compartment for treating food stored therein and for sterilizing air within the compartment, an electric circuit for said lamp, and a single means operated automatically in response to conditions of said refrigerating system for controlling said electric circuits to start and stop operation of said unit and to cause automatically controlled intermittent periods of effectiveness of said ultra-violet lamp whereby overtreatment of said food is prevented.

HARRY B. HULL.